United States Patent [19]
Tanaka

[11] Patent Number: 5,982,134
[45] Date of Patent: Nov. 9, 1999

[54] METHOD AND APPARATUS FOR DRIVING A STEPPING MOTOR

[75] Inventor: Hirotomo Tanaka, Nagano, Japan

[73] Assignee: Seiko Epson Corporation, Tokyo, Japan

[21] Appl. No.: 09/081,139

[22] Filed: May 19, 1998

[30] Foreign Application Priority Data

May 20, 1997 [JP] Japan ................................. 9-130103
May 20, 1997 [JP] Japan ................................. 9-130104

[51] Int. Cl.$^6$ .................................................. H02P 8/00
[52] U.S. Cl. ........................................... 318/696; 318/685
[58] Field of Search ............................ 318/696, 685, 318/561

[56] References Cited

U.S. PATENT DOCUMENTS 4,743,824  5/1988  Andersson ............................... 318/696
4,908,562  3/1990  Back ........................................ 318/696

FOREIGN PATENT DOCUMENTS 62-254696  11/1987  Japan ............................... H02P 8/00

*Primary Examiner*—William M. Shoop, Jr.
*Assistant Examiner*—Rita Leykin

*Attorney, Agent, or Firm*—Sughrue, Mion, Zinn, Macpeak & Seas, PLLC

[57] ABSTRACT

When a stepping motor is driven by supplying to the drive coil of the stepping motor a drive current whose amplitude is periodically increased and attenuated with time in a state that the upper peaks of the current variation are limited to be within set values of current being varied stepwise and in a substantially sinusoidal fashion, the drive current to be fed to the drive coil is controlled such that a waveform of the drive current is configured so as to approximate to a sinusoidal waveform over one period of the waveform. To such a current control, each set value is larger than that obtained from a sinusoidal waveform. The drive current may be attenuated, in each step of the related set value, at a first attenuating rate and a second attenuating rate smaller than the first attenuating rate, the first and second attenuating rates being combined at a ratio of n/m (n: a positive integer, m a positive integer except n). In the latter current control, the drive current is attenuated at a first attenuating rate for a first period of time subsequent to the shifting of one step of a set value to the next or second step of another set value, and the drive current is attenuated at a second attenuating rate, which is smaller than the first attenuating rate, for a second period of time ranging from the end of the first period till the second step shifts to the next step of still another set value.

17 Claims, 7 Drawing Sheets

| D2 | D1 | D0 | CURRENT VALUE (%) | |
|---|---|---|---|---|
| | | | PRESENT INVENTION | CONVENTIONAL ART |
| 1 | 1 | 1 | 100 % | 100 |
| 1 | 1 | 0 | 92.4 | 92.4 |
| 1 | 0 | 1 | 83.1 | 83.1 |
| 1 | 0 | 0 | 70.7 | 70.7 |
| 0 | 1 | 1 | 57.0 | 55.5 |
| 0 | 1 | 0 | 41.0 | 38.2 |
| 0 | 0 | 1 | 25.0 | 19.5 |
| 0 | 0 | 0 | 0 | 0 |

| D2 | D1 | D0 | CURRENT VALUE (%) |
|----|----|----|-------------------|
| 1  | 1  | 1  | 100               |
| 1  | 1  | 0  | 92.4              |
| 1  | 0  | 1  | 83.1              |
| 1  | 0  | 0  | 70.7              |
| 0  | 1  | 1  | 55.5              |
| 0  | 1  | 0  | 38.2              |
| 0  | 0  | 1  | 19.5              |
| 0  | 0  | 0  | 0                 |

FIG. 10

METHOD AND APPARATUS FOR DRIVING A STEPPING MOTOR

BACKGROUND OF THE INVENTION

1. Field of the Invention

The present invention relates to a method and an apparatus for driving a stepping motor, and more particularly to a method and an apparatus for driving a stepping motor incorporated into, for example, a drive system in a printing mechanism of a printer, and to improvements of a microstep drive technique for driving the stepping motor.

2. Related Art

The stepping motor is widely used in various devices and apparatuses where a rotary mechanism requires a highly precise control, e.g., printer, in particular a drive system for its printing mechanism. As well known, the stepping motor is a rotary machine of the type in which a pulsative drive current is fed to the drive coil (stator) of the motor, and a rotor of the motor is rotated at a speed defined by a pulse frequency of the drive current and at an angle defined by the number of pulses of the drive current.

Figure 1:
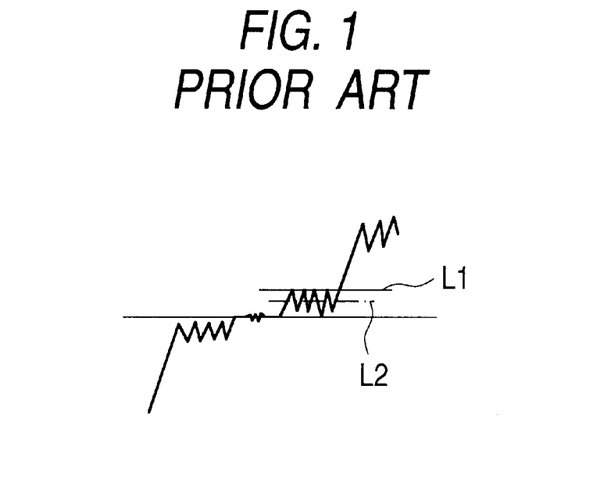
FIG. 1 is a waveform diagram showing a drive current used in a conventional microstep driving method.

One of the known drive methods of this type is a "microstep drive" method, disclosed in Japanese Patent Laid-Open Publication No. Sho-62-254696. The microstep drive method is as follows. A sinusoidal waveform is sampled at a given resolution, and the sampled amplitudes are composed to form a substantially sinusoidal waveform in which the sampled amplitudes of the waveform are stepwise chained to form a contour of the sinusoidal waveform. A waveform of the drive current fed to the stepping motor is shown in FIG. 1. A set value of each step of the waveform of the drive current is set at L1. The drive current is alternately increased and attenuated in the step, with its upper peaks being limited within the set value L1. Such a drive current is formed by chopping.

In this microstep drive method, the value of the drive current actually flowing through the stepping motor, i.e., an average value L2 of the drive current, is smaller than the set value L1 of the step. Therefore, the waveform composed by the set values is somewhat lean when compared with an ideal sinusoidal waveform. Thus, in the conventional microstep drive, a changing rate of the amplitude of the waveform is smaller than that of the ideal sinusoidal waveform in the vicinity of the zero-crossing point. This appears as an irregular rotation of the stepping motor. The irregular rotation brings about a vibration of the motor. Therefore, when the stepping motor is used for driving the carriage or platen of the printer, noise is generated when the motor rotates and the print quality of the resultant print is deteriorated.

In case where the microstep drive is used for the stepping motor, two chopping methods are used. A first chopping method attenuates the drive current relatively gently or at a small attenuating rate, and a second chopping method attenuates the drive current sharply or at a large attenuating rate.

In the first chopping method, the attenuation of the drive current is gentle. Therefore, the waveform of the drive current is distorted as a whole from an ideal sinusoidal waveform when the drive current waveform is shifted from one step to the next step. The waveform distortion causes the motor to vibrate and to generate a noise. Further, it increases a motor copper loss, so that the quantity of heat generated by the drive coils and the drive apparatus is increased.

In the second chopping method, the chopping frequency is high. Therefore, the motor copper loss is large, and hence the quantity of heat generated by the drive coils and the drive apparatus is increased. Further, the ripple component is increased, so that the motor torque is reduced.

Figure 2:
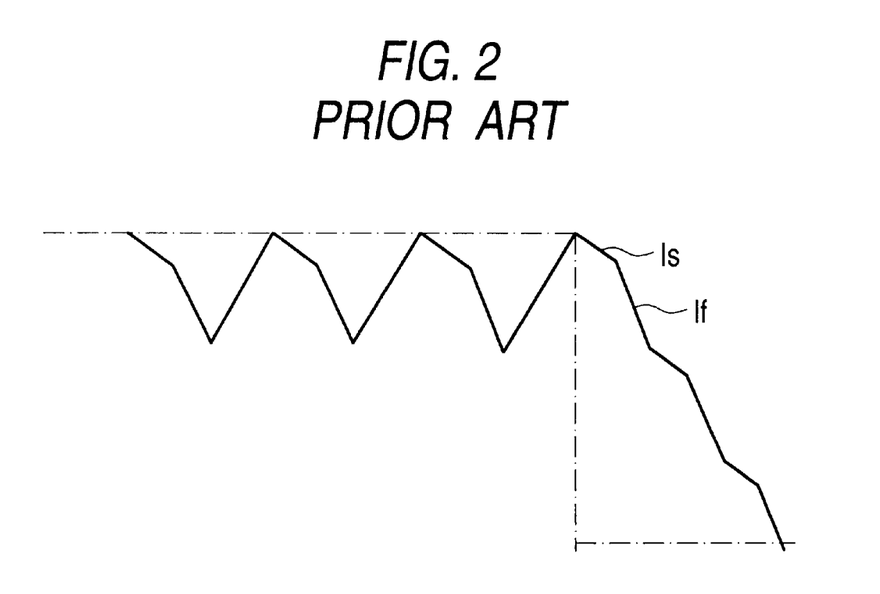
FIG. 2 is a waveform diagram showing the detail of the drive current in the conventional microstep driving method.

A proposal is made to solve those problems. In the proposal, as shown in FIG. 2, the current is first attenuated at a relatively small attenuation rate Is (attenuating is relatively gentle), then it is attenuated at a relatively large attenuating rate If (attenuation is relatively sharp), then it is attenuated at the attenuating rate Is, and then it is attenuated at the attenuating rate If, and so on. The proposed chopping method insufficiently removes the adverse effect of the distortion of the drive current in a region where the set value of the drive current decreases in its absolute value. Therefore, the proposed chopping method insufficiently suppresses the vibration and noise generation in this set-value decreasing region.

SUMMARY OF THE INVENTION

Accordingly, an object of the present invention is to provide a method and an apparatus for driving a stepping motor, which can reduce the irregular rotation of the motor.

Another object of the present invention is to provide a method and an apparatus for driving a stepping motor, which can satisfactorily suppress the vibration of and noise generation by the stepping motor.

According to the present invention, there is provided a method for driving a stepping motor by supplying to the drive coil of the stepping motor a drive current whose amplitude is periodically increased and attenuated with time such that the upper peaks of the current variation are limited to remain within set values of a current being varied stepwise and in a substantially sinusoidal fashion, the method being characterized in that the drive current to be fed to the drive coil is controlled such that a waveform of the drive current is configured so as to be approximate to a sinusoidal waveform over one period of the waveform.

In order to control the drive current such that a waveform of the drive current is configured so as to approximate to a sinusoidal waveform over one period of the waveform, each set value is larger than that obtained from a sinusoidal waveform.

Alternatively, to achieve such a drive current control, the drive current is attenuated in each step of the related set value, at a first attenuating rate and a second attenuating rate smaller than the first attenuating rate, the first and second attenuating rates being combined at a ratio of n/m (n: a positive integer, m: a positive integer except n).

In another method for driving a stepping motor by supplying to the drive coil of the stepping motor a drive current whose amplitude is periodically increased and attenuated with time such that the upper peaks of the current variation are limited to be within set values of current being varied stepwise and in a substantially sinusoidal fashion, the set values in an amplitude-presence region in the vicinity of the zero-cross point of the drive current are selected to be larger than the set values obtained from a sinusoidal waveform in the amplitude-presence region, to thereby configure a waveform of the drive current so as to approximate to a sinusoidal waveform as a whole. This driving method may be realized by controlling the drive current such that an average value of the amplitudes of the drive current flowing through the drive coil in the amplitude-presence region is approximately equal to the set values obtained from a sinusoidal waveform in the amplitude-presence region.

There is still another method for driving a stepping motor by supplying to the drive coil of-the stepping motor a drive current whose amplitude is periodically increased and attenuated with time such that the upper peaks of the current variation are limited to remain within set values of current being varied stepwise and in a substantially sinusoidal fashion, the driving method being characterized in that the drive current is attenuated at a first attenuating rate for a first period of time subsequent to the shifting of one step of a set value to the next or second step of another set value, and the drive current is attenuated at a second attenuating rate, which is smaller than the first attenuating rate, for a second period of time ranging from the end of the first period until the second step shifts to the next step of still another set value.

The first period is a predetermined time duration or a time period ranging from a time point at which one step of a set value shifts to the next step of another set value until the amplitude value of the drive current reaches the set value of the next step.

In the driving method, a decreasing region where the absolute value of the set value decreases is detected, and when the set value is contained in the decreasing region, the drive current is attenuated at the first attenuating rate for the first period, and at the second attenuating rate for the second period. When the set value is not contained in the decreasing region, the drive current is attenuated at the second attenuating rate for the first and second periods. Further, the set values are varied so that an amplitude variation of the drive current is configured to be substantially sinusoidal.

The present invention provides a drive device for driving a stepping motor by supplying to the drive coil of the stepping motor a drive current whose amplitude is periodically increased and attenuated with time such that the upper peaks of the current variation are limited to remain within set values of current being varied stepwise and in a substantially sinusoidal fashion, the drive device comprising: a phase determining means for determining a phase of the drive current; and set value determining means for determining the set values of the steps of the drive current whose phase is determined the phase determining means, the set value determining means setting the set values in an amplitude-presence region in the vicinity of the zero-cross point of the drive current to be larger than the set values obtained from a sinusoidal waveform in the amplitude-presence region. In this drive device, the set value determining means is able to dynamically. change the set values of the steps of the waveform of the drive current.

The present invention provides another drive device for driving a stepping motor by supplying to the drive coil of the stepping motor a drive current whose amplitude is periodically increased and attenuated with time such that the upper peaks of the current variation are limited to remain within set values of current being varied stepwise and in a substantially sinusoidal fashion, the drive device comprising: current supplying means for supplying the drive current to the stepping motor; first set-up means for setting up a first attenuating rate of the drive current; second set-up means for setting up a second attenuating rate of the drive current; current detecting means for detecting the drive current; and control means for controlling the current supplying means in a manner such that the drive current is attenuated at a first attenuating rate for a first period of time subsequent to the shifting of one step of a set value to the next or second step of another set value, and the drive current is attenuated at a second attenuating rate, which is smaller than the first attenuating rate, for a second period of time ranging from the end of the first period until the second step shifts to the next step of still another set value.

The drive device preferably includes time setting means for setting the first period. In the drive device, when the current detecting means detects that the set value of one step is switched to another set value of the next step, the control means terminates the first period.

The drive device preferably includes a region detecting means for detecting a decreasing region where the absolute value of the set value decreases, wherein when the set value is contained in the decreasing region, the control means causes the drive current to be attenuated at the first attenuating rate for the first period, and to be attenuated at the second attenuating rate for the second period. When the set value is-not contained in the decreasing region, the control means causes the drive current to be attenuated at the second attenuating rate for the first and second periods. Further, the set values are varied so that an amplitude variation of the drive current is configured to be substantially sinusoidal.

DETAILED DESCRIPTION OF THE PREFERRED EMBODIMENTS

The preferred embodiments of the present invention will be described in detail with reference to the accompanying drawings.

Figure 3:
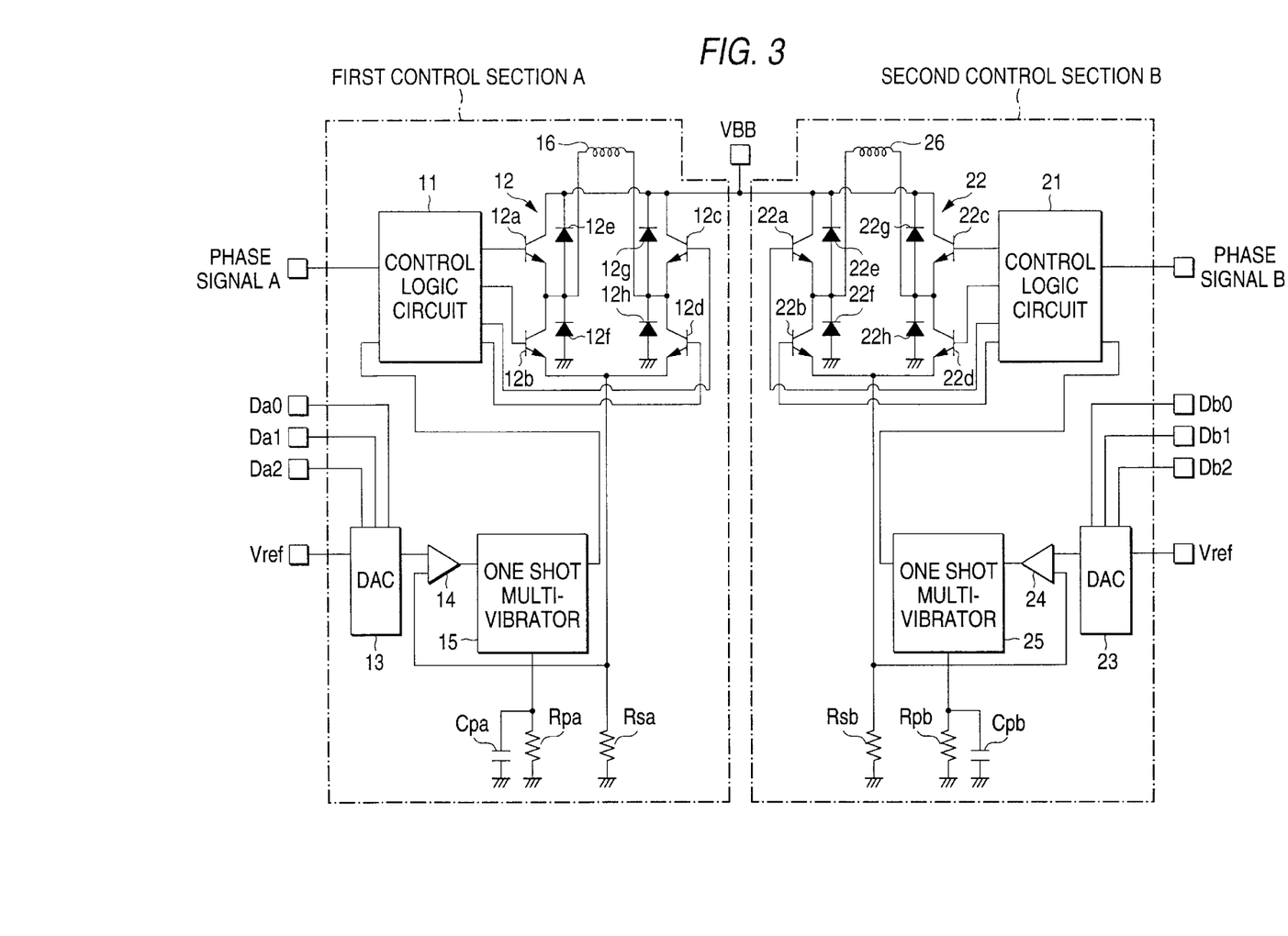
FIG. 3 is a circuit diagram showing an arrangement of a drive device for a stepping motor, which is an embodiment of the present invention.

FIG. 3 is a circuit diagram showing an arrangement of a drive device for a stepping motor, which is an embodiment of the present invention. The drive device is made up of a first control section A and a second control section B. The first control section A includes a control logic circuit 11, a drive circuit 12, a digital to analog converter (DAC) 13, a comparator 14, a one-shot multi-vibrator 15, a drive coil 16 and others, and those components are interconnected as shown. Similarly, the second control section B includes a control logic circuit 21, a drive circuit 22, a digital to analog converter (DAC) 23, a comparator 24, a one-shot multi-vibrator 25, a drive coil 26 and others, and those components are interconnected as shown. The drive coils 16 and 26 form a stator of a stepping motor (of 2-phase type), not shown.

Currents are fed to the drive coils 16 and 26, and a rotor of the stepping motor rotates.

The circuit arrangement of the first control section A is the same as that of the second control section B as shown in FIG. 3, but the current fed from the first control section A to the drive coil 16 is different in phase from the current fed from the second control section B to the drive coil 26. Only the first control section A will typically be described for ease of explanation.

A phase signal A, and an output signal of the one-shot multi-vibrator 15 are applied to the control logic circuit 11. The control logic circuit 11 controls the drive circuit 12 in accordance with those received signals. The phase signal A is used for determining a phase of drive current output from the drive circuit 12. The control logic circuit 11 controls the drive circuit 12 such that the drive circuit 12 outputs a positive drive current in the range where the phase signal A is positive, and it produces a negative drive current in the range where the signal A is negative (see FIG. 4). The phase signal A is shifted by 90° in phase from the phase signal B.

In the drive circuit 12, four transistors 12a to 12d are connected in a bridge fashion. A diode for back electromotive force regeneration is inserted between the emitter and the collector of each of the transistors 12a to 12d. Those diodes are denoted as 12e to 12h, respectively. The output signals of the control logic circuit 11 are applied to the bases of those transistors 12a to 12d, respectively. The drive circuit 12 performs a constant current chopping operation in accordance with the output signals of the control logic circuit 11 to generate a drive current, and feeds the drive current to the drive coil 16, whereby the stepping motor is turned as intended.

The operation of the first control section A will be described more specifically. When the chopping is in an ON state, the transistors 12a and 12d are turned on to form a current path including a power source VBB, transistor 12a, drive coil 16, and transistor 12d. A current flows through the formed current path to form an increasing portion (increasing waveform) of the waveform of the drive current. Then, the chopping is put to an OFF state to perform a current regeneration. Through the current regeneration, a decreasing or attenuating portion (attenuating waveform) of the drive current is formed. The drive circuit 22 of the second control section B, which is made up of transistors 22a to 22d, diodes 22e to 22h, and the like, also operates in a similar manner.

Three digital signals Da0 to Da2, and a reference voltage signal Vref are input to the DAC 13. These digital signals Da0 to Da2 (current value setting signals) are used for setting the values of the drive current output from the drive circuit 12. The combinations of those digital signals Da0 to Da2 and the values set by the combinations may be dynamically altered by a setting circuit (not shown). The setting circuit may be realized by a known means, and hence no further description of it will be given here.

The present embodiment is arranged such that the drive current is expressed in terms of-eight values or states (000, 001, 010, 011, 100, 101, 110 and 111) by the setting circuit. The DAC 13 produces an analog signal representative by the result of multiplying the reference voltage signal Vref by a given rate (%) of one of the eight states (see FIG. 5). The output signal of the DAC 13 becomes a set value of current of each step in the microstep drive for the stepping motor.

The comparator 14 receives an output signal of the DAC 13 and a drive current of the stepping motor, which is detected by a resistor Rsa, and produces a signal representative of a difference between them. The difference signal is applied to the one-shot multi-vibrator 15.

The one-shot multi-vibrator 15 produces a signal whose period is determined by a time constant of a parallel circuit consisting of a capacitor Cpa and a resistor Rpa, and applies it to the control logic circuit 11. The control logic circuit 11 controls the drive circuit 12 in accordance with the period of the signal received from the one-shot multi-vibrator 15.

The circuit components of the second control section B operate as those of the first control section A do. Through the operations of those control sections, drive currents are fed to the drive coils 16 (26), respectively. Each drive current is alternately increased and attenuated in a state such that the upper peaks of the current variation are limited to remain within the set values of current at the steps.

The operation of the thus arranged drive device for the stepping motor will be described with reference to FIGS. 4 and 5.

Figure 4:
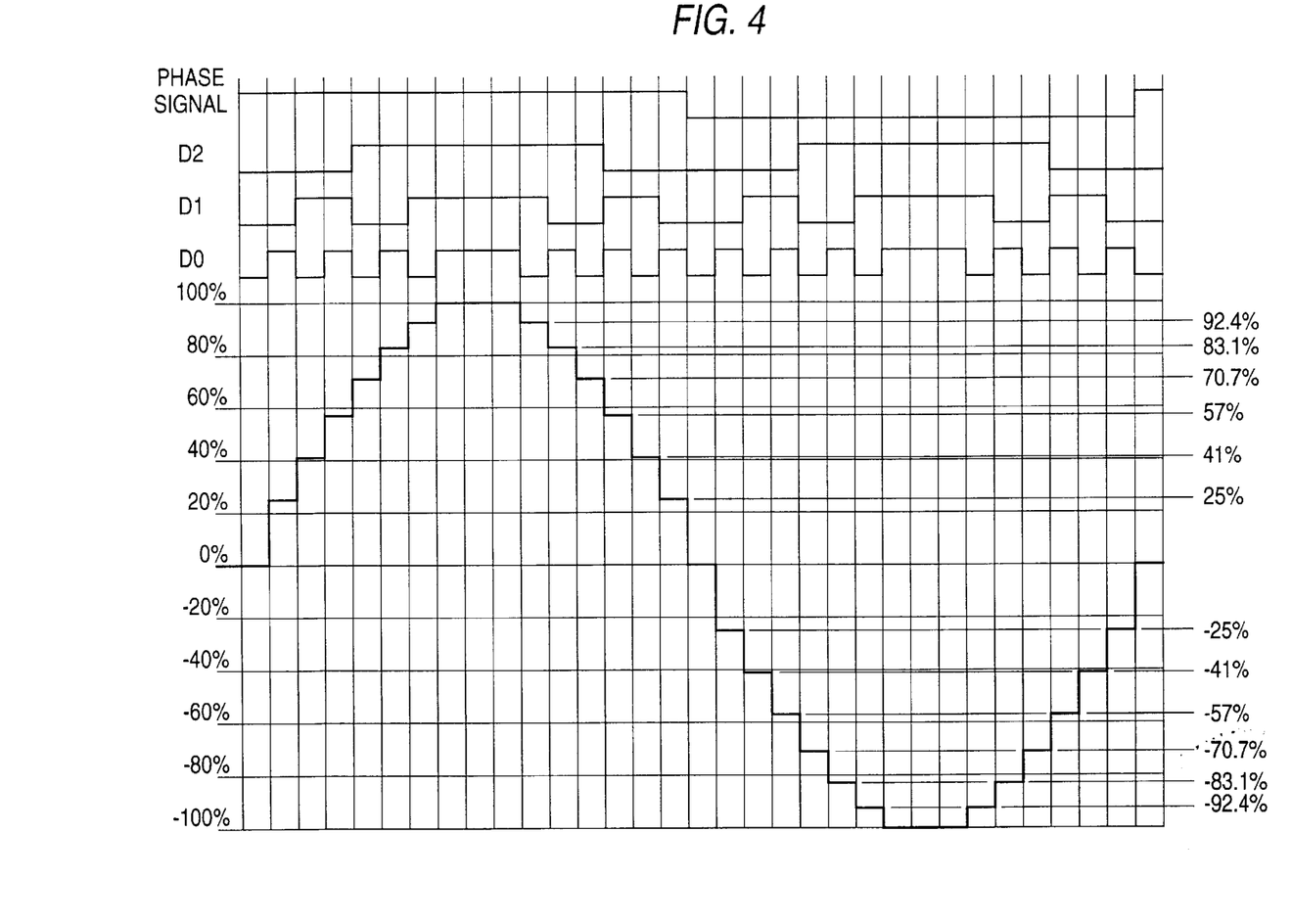
FIG. 4 is a graph useful in explaining the operation of the drive device of FIG. 3.

A waveform located in the uppermost portion in FIG. 4 is the phase signal, the phase signal A or the phase signal B, and waveforms D0, D1 and D2 located under the phase signal are those of the digital signals Da0 to Da2 (Db0 to Db2). A stepped waveform that substantially sinusoidally varies as a whole and is indicated by a bold line indicates a variation of values of the signals output from the DAC 13 when it receives digital signals D0 to D2. The values of the output signals are the set values of the drive current fed to the drive coil 16 (26) at the respective steps. The current actually flowing into the drive coil 16 (26) is alternately increased and attenuated in a state such that the upper peaks of the current variation are limited to be within the set values of current at the steps. In the instance of FIG. 4, the phase signal is first positive. During the time period where the phase signal is positive, the set value of current is stepwise increased from 0% to 100% and then is stepwise attenuated from 100% to 0%. Then, the phase signal goes negative. During the time period of a negative state of the phase signal, the set value of the drive current is stepwise decreased from 0% to −100%, and then is stepwise increased from −100% to 0%. Through the alternate variation of increase and decrease of the drive current, the microstep drive for the stepping motor is progressively performed.

Figure 5:
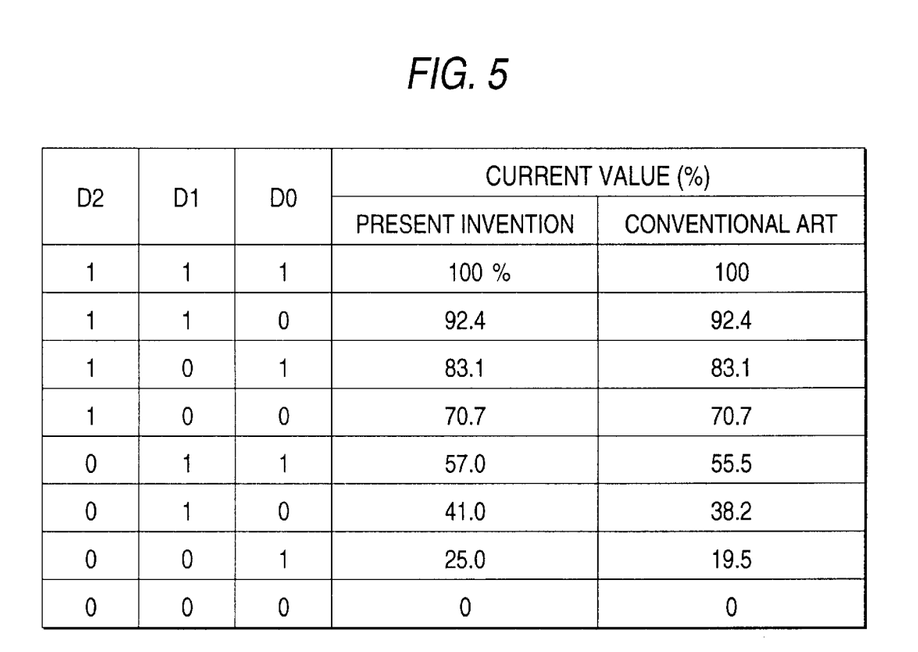
FIG. 5 is a table showing the correspondence between combinations of digital signals (FIG. 4) and set values of drive current.
Figure 6:
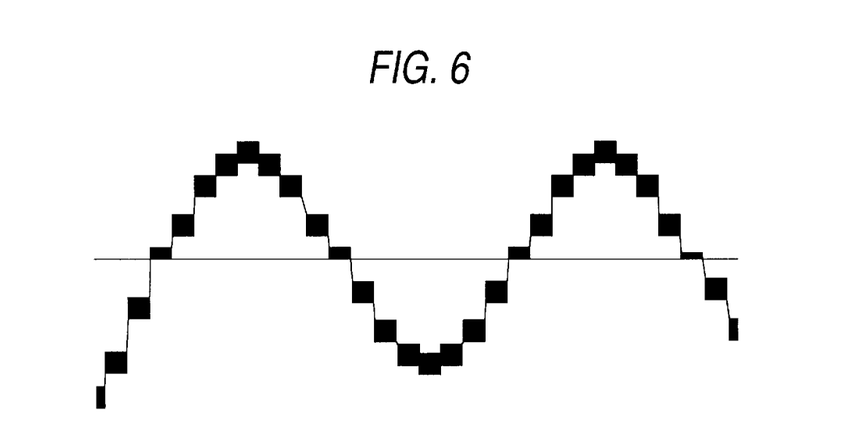
FIG. 6 is a waveform diagram showing a drive current which is used for driving a stepping motor in a microstep drive mode by the FIG. 3 drive device.

The correspondence between the combinations of the digital signals D2, D1 and D0, and the rates of the values of the current output from the DAC 13 (23) to the reference voltage signal Vref are tabulated in FIG. 5. The correspondence is tabulated in the setting circuit.

In FIG. 5, "100%" indicates that the reference voltage signal Vref is straightforwardly output, and "92.4%" indicates that the voltage output from the DAC is 92.4% of the reference voltage signal Vref (Vref×0.924). In the table, "Conventional Art" of "Current Value (%)" enumerates set values (upper limits) of drive current that are obtained, while using the drive device of the invention for ease of explanation, by merely sampling a sinusoidal wave, not taking the current actually flowing into the drive coil 16 (26), i.e., the average value of the drive current, into consideration. In this instance, eight set values are used corresponding to the sampling periods: these values are 0%, 19.5%, 38.2%, 55.4%, 70.7%, 83.1%, 92.4%, and 100%. "Invention" of "Current Value (%)" enumerates eight set values (upper limits) of drive current used in the present embodiment, corresponding to the set values of the conventional art: those set values are 0%, 25%, 41%, 57%, 70.7%, 83.1%, 92.4%, and 100%.

In the table of FIG. 5, the set values of three steps in "Invention" of "Current Value (%)" are somewhat larger than those of "Conventional Art" of "Current Value (%)", 55.5%, 38.2% and 19.5%. Those three steps are present in an amplitude-presence region in the vicinity of the zero-cross point in the waveform of the drive current. The reason for this follows. In the prior device, those set values are obtained by merely dividing a sinusoidal waveform at a given rate. On the other hand, in the invention, the average values of the amplitudes of the current actually flowing through the drive coil 16 (26) are set at relatively large values or are equal to the set values (upper limit values) of the prior device in order to approximate the average amplitude values of the drive current to those of an ideal sinusoidal waveform.

The sinusoidal waveform composed including the set values of those steps is configured such that the portions of the waveform in the amplitude-presence region in the vicinity of the zero-crossing point are distorted to be somewhat thinner than the corresponding portions of an ideal sinusoidal waveform. The current actually flowing through the drive coil 16 (26) takes an ideal sinusoidal waveform, however. As a result, an irregular rotation of the stepping motor is suppressed, and this solves the problem of the prior device.

The embodiment under discussion uses eight set values, 0%, 25%, 41%, 57%, 70,7%, 83.1%, 92.4%, and 100%. In the present invention for approximating the waveform of the current actually flowing through the drive coil 16 (26) to an ideal sinusoidal waveform, the resolution for the sampling of a sinusoidal waveform and the set values of the respective steps may properly be selected.

As described above, the drive device of the first embodiment can drive the stepping motor while being free from the irregular rotation. Therefore, when the drive device is incorporated into a stepping motor, and the motor is used for driving the carriage or platen of a printer, the printer operates with less noise and less vibration of the motor, and without deterioration of the print quality.

Another embodiment of the present invention will be described.

Figure 7:
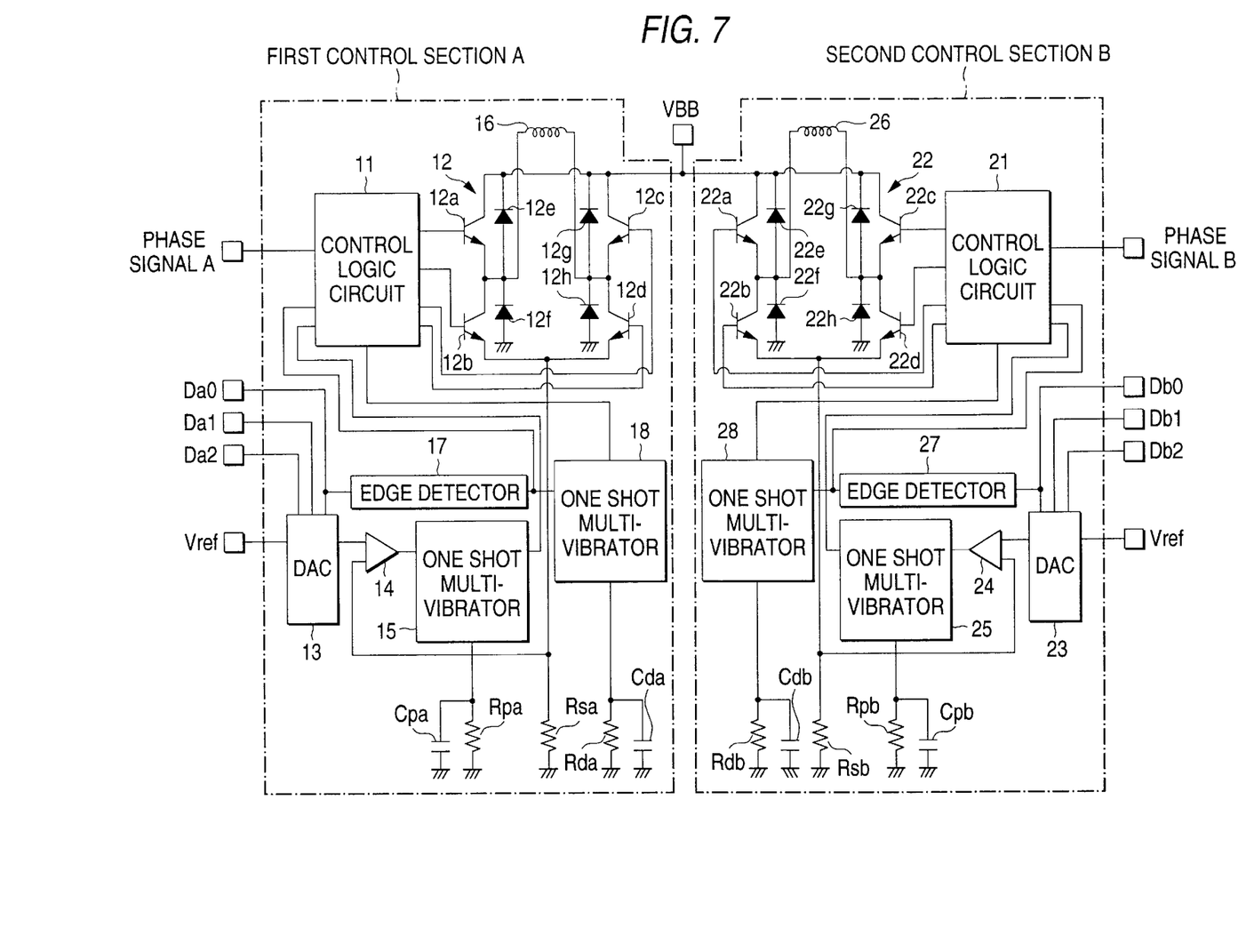
FIG. 7 is a circuit diagram showing an arrangement of a drive device for a stepping motor, which is another embodiment of the present invention.

FIG. 7 is a circuit diagram showing an arrangement of a drive device for a stepping motor, which is another embodiment of the present invention. For simplicity, like reference numerals are used for designating like or equivalent portions in the drawings for the first embodiment already described.

The drive device is made up of a first control section A and a second control section B. The first control section A includes a control logic circuit 11, a drive circuit 12, a digital to analog converter (DAC) 13, a comparator 14, a one-shot multi-vibrator 15, a drive coil 16, an edge detector 17, a one-shot multi-vibrator 18, and others, and those components are interconnected as shown. Similarly, the second control section B includes a control logic circuit 21, a drive circuit 22, a digital to analog converter (DAC) 23, a comparator 24, a one-shot multi-vibrator 25, a drive coil 26, an edge detector 27, a one-shot multi-vibrator 28, and others, and those components are interconnected as shown. The drive coils 16 and 26 form a stator of a stepping motor (of 2-phase type), not shown. Currents are fed to the drive coils 16 and 26, and a rotor of the stepping motor rotates.

The circuit arrangement of the first control section A is the same as that of the second control section B as shown in FIG. 7, but the current fed from the first control section A to the drive coil 16 is different in phase from the current fed from the second control section B to the drive coil 26. Only the first control section A will typically be described for ease of explanation.

A phase signal A, and output signals of the one-shot multi-vibrators 15 and 18 are applied to the control logic circuit 11. The control logic circuit 11 controls the drive circuit 12 in accordance with those received signals. In this sense, the control logic circuit 11 constitutes a control means for controlling the drive circuit 12.

The phase signal A is used for determining a phase of drive current output from the drive circuit 12. The control logic circuit 11 controls the drive circuit 12 such that the drive circuit 12 outputs a positive drive current in the range where the phase signal A is positive, and it produces a negative drive current in the range where the signal A is negative (see FIG. 8). The phase signal A is shifted by 90° in phase from the phase signal B.

In the drive circuit 12, four transistors 12a to 12d are connected in a bridge fashion. A diode for back electromotive force regeneration is inserted between the emitter and the collector of each of the transistors 12a to 12d. Those diodes are denoted as 12e to 12h, respectively. The output signals of the control logic circuit 11 are applied to the bases of those transistors 12a to 12d, respectively. The drive circuit 12 performs a constant current chopping operation in accordance with the output signals of the control logic circuit 11 to generate a drive current, and feeds the drive current to the drive coil 16, whereby the stepping motor is turned as intended. In this sense, the drive circuit 12 constitutes a current supplying means for supplying the drive current to the drive coil 16 of the stepping motor.

The operation of the first control section A will be described more specifically. When the chopping is in an ON state, the transistors 12a and 12d are turned on to form a current path including a power source VBB, transistor 12a, drive coil 16, and transistor 12d. A current flows through the formed current path to form an increasing portion (increasing waveform) of the waveform of the drive current. Then, the chopping is put to an OFF state to perform a current regeneration; both the transistors 12a and 12d are concurrently turned off to form a current path ranging from the diode 12f, drive coil 16, and transistor 12g, and power source VBB. The current flowing through this regenerative current path forms a first decreasing or attenuating portion (first attenuating waveform) of the waveform of the drive current. The first attenuating waveform is steep. In putting the chopping to an OFF state, the transistor 12a is turned off while the transistor 12d remains ON, to form a current path ranging from the diode 12f, drive coil 16, transistor 12d, and resistor Rsa. The current flowing through this regenerative current path forms a second decreasing or attenuating portion (second attenuating waveform) of the waveform of the drive current. The second attenuating waveform is gentle.

Three digital signals Da0 to Da2, and a reference voltage signal Vref are input to the DAC 13. These digital signals Da0 to Da2 (current value setting signals) are used for setting the values of the drive current output from the drive circuit 12. The combinations of those digital signals Da0 to Da2 and the values set by the combinations may be dynamically altered by a setting circuit (not shown). The setting circuit may be realized by a known means, and hence no further description of it will be given here.

The embodiment under discussion is arranged such that the drive current is expressed in terms of eight values or states (000, 001, 010, 011, 100, 101, 110 and 111) by the setting circuit. The DAC 13 produces an analog signal representative of the result of multiplying the reference voltage signal Vref by a given rate (%) of one of the eight states (see FIG. 9). The output signal of the DAC 13 becomes a set value of current of each step in the microstep drive for the stepping motor.

The comparator 14 receives an output signal of the DAC 13 and a drive current of the stepping motor, which is detected by a resistor Rsa, and produces a signal representative of a difference between them. When the output signal of the DAC 13 is larger than the drive current, the difference signal is positive, while when the former is smaller than the latter, it is negative. The difference signal is applied to the one-shot multi-vibrator 15. The resistor Rsa constitutes a current detecting means for detecting the drive current.

The one-shot multi-vibrator 15 produces a signal whose period is determined by a time constant of a parallel circuit consisting of a capacitor Cpa and a resistor Rpa, and applies it to the control logic circuit 11. The one-shot multi-vibrator 15 sets a time period for the attenuation of the drive current at the second attenuating rate.

The one-shot multi-vibrator 18 produces a signal whose period is determined by a time constant of a parallel circuit consisting of a capacitor Cda and a resistor Rda, and applies it to the control logic circuit 11. The one-shot multi-vibrator 18 sets a time period for the attenuation of the drive current at the first attenuating rate. This time period is a first period shown in FIG. 10.

The edge detector 17 detects the leading and trailing edges of the signal Da0. The output signal of the edge detector 17 is input to the one-shot multi-vibrator 18.

The control logic circuit 11 controls the setting of the attenuating rates by the drive circuit 12 in accordance with the time periods of the signals received from the one-shot multi-vibrators 15 and 18. That is, when the edge detector 17 detects the edges of the signal Da0, the control logic circuit 11 validates the setting of the first period by the one-shot multi-vibrator 18. When it does not detect the same, the control logic circuit 11 validates the setting of a second period by the one-shot multi-vibrator 15.

Specifically, the control logic circuit 11 controls the drive circuit 12 such that the drive current is attenuated at the first attenuating rate for the first period subsequent to the edge detection by the edge detector 17, and at the second attenuating date for a time attenuating period (second period in FIG. 10) ranging from the end of the first period till the edge detector 17 detects the next edges of the signal Da0.

The circuit components of the second control section B operate as those of the first control section A do. Through the operations of those control sections, drive currents are fed to the drive coils 16 (26), respectively. Each drive current is alternately increased and attenuated in a state that the upper peaks of the current variation are limited to be within the set values of current at the steps.

The operation of the thus arranged drive device for the stepping motor will be described with reference to FIGS. 8 and 9.

Figure 8:
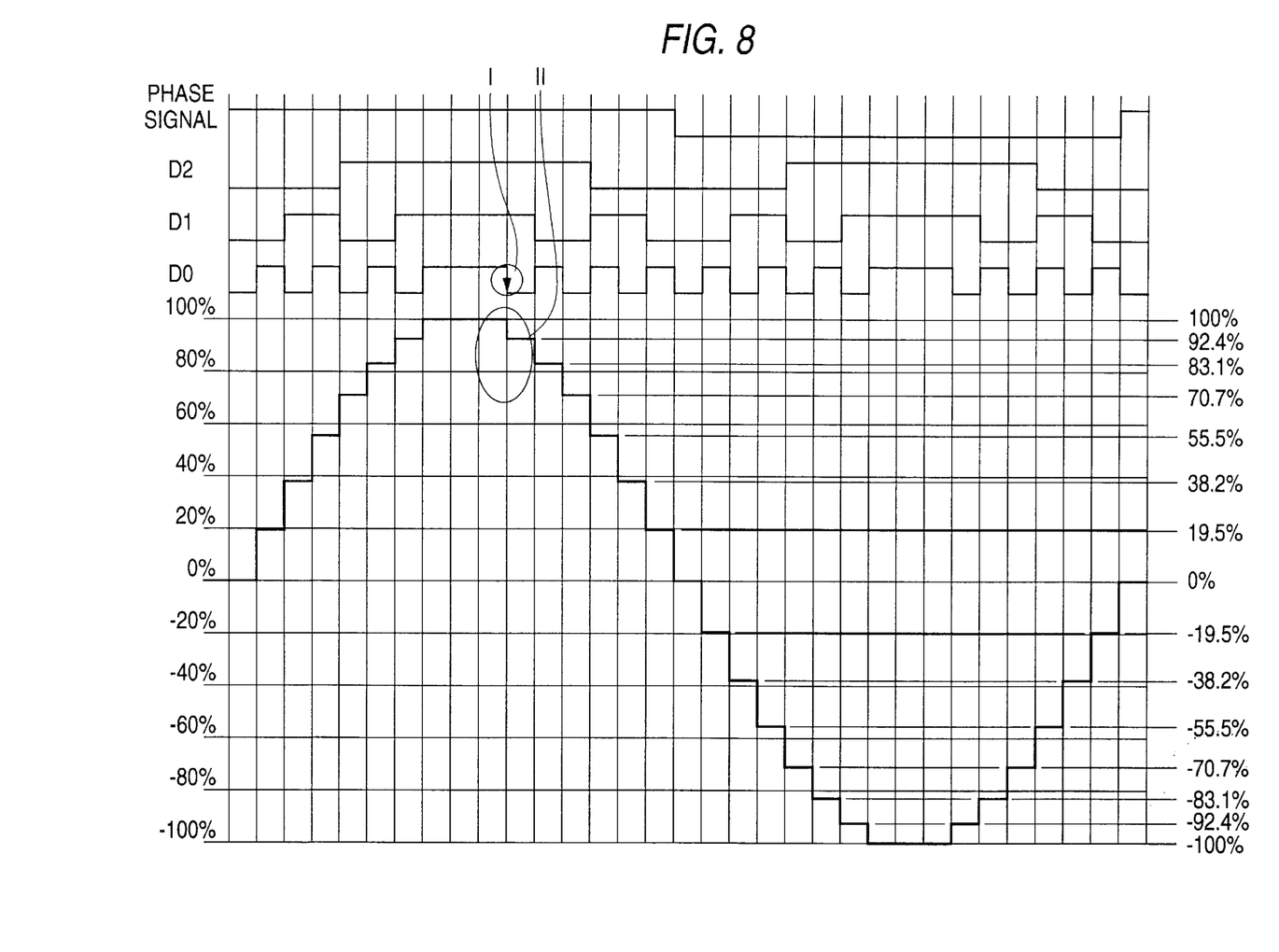
FIG. 8 is a graph useful in explaining the operation of the drive device of FIG. 7.
Figure 10:
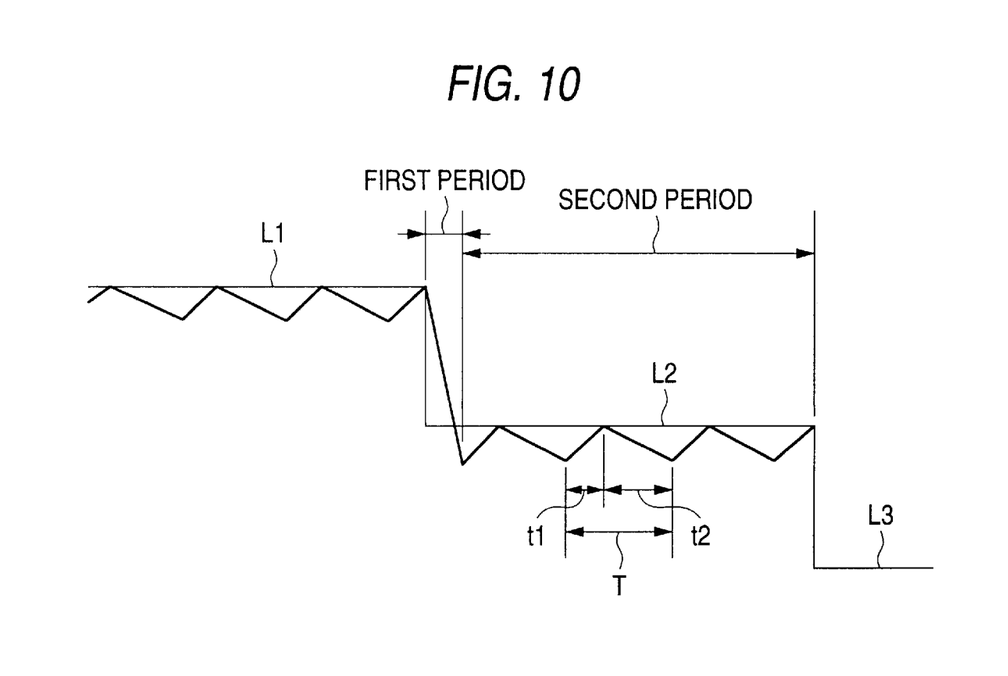
FIG. 10 is a waveform diagram showing a drive current indicated by II in the FIG. 7 chart in an enlarged fashion.

A waveform located uppermost in FIG. 8 indicates that of the phase signal, the phase signal A or the phase signal B, and waveforms D0, D1 and D2 located under the phase signal are those of the digital signals Da0 to Da2 (Db0 to Db2). A stepped waveform indicated by a bold line in FIG. 8 indicates a variation of values of the signals output from the DAC 13 when it receives digital signals D0 to D2. The values of the output signals are the set values of the drive current fed to the drive coil 16 (26) at the respective steps. The current actually flowing into the drive coil 16 (26), as shown in FIG. 10, is chopped so as to approach the set values L1, L2 or L3 of the drive current in the respective steps. In the instance of FIG. 8, the phase signal is first positive. In this positive state, the set value of current is stepwise increased from 0% to 100% and then is stepwise attenuated from 100% to 0%. Then, the phase signal goes negative. In this state, the set value of the drive current is stepwise decreased from 0% to −100%, and then is stepwise increased from −100% to 0%. Through the alternate variation of increase and decrease of the drive current, the microstep drive for the stepping motor is progressively performed.

Figure 9:
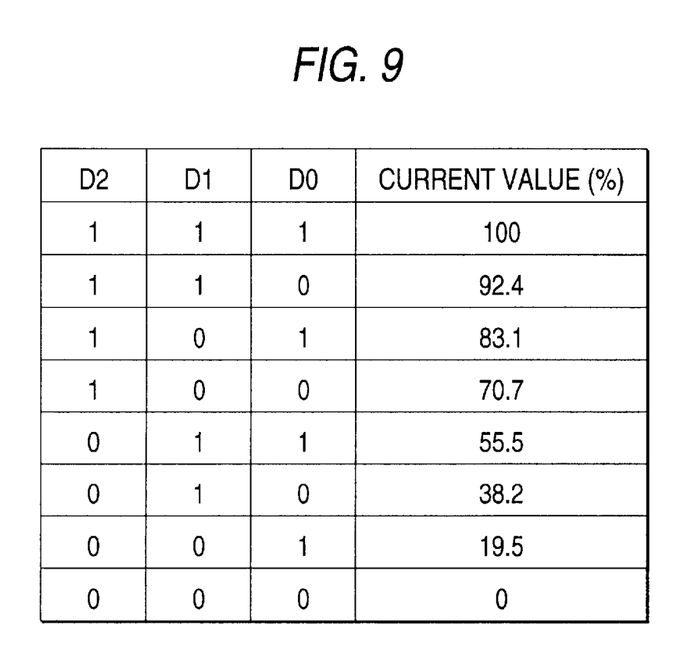
FIG. 9 is a table showing the correspondence between combinations of digital signals (FIG. 7) and set values of drive current.

The correspondence between the combinations of the digital signals D2, D1 and D0, and the rates of the values of the current output from the DAC 13 (23) to the reference voltage signal Vref are tabulated in FIG. 9. In FIG. 9, "100%" indicates that the reference voltage signal Vref is straightforwardly output, and "92.4%" indicates that the voltage output from the DAC is 92.4% of the reference voltage signal Vref (Vref×0.924). In this instance, the set values (%) are obtained by sampling a normal sinusoidal waveform in a stepwise (digital) manner. The following eight set values are set for the eight states; 0%, 19.5%, 38.2%, 55.4%, 70.7%, 83.1%, 92.4%, and 100%.

FIG. 10 shows a waveform of the drive current in a portion II in FIG. 8, viz., the detail waveform of the drive current fed to the drive coil 16 (26). As seen from the figure, the drive current consists of current components, each of which alternately increases and decrease at the period T. Each current component includes an increasing region t1 where the current gradually increases in amplitude, and a attenuating region t2 following the increasing region t1. In the attenuating region t2, the amplitude of the current gradually decreases. In a step, the drive current repeats alternately its increase and its decease so as to approach to the set value of the step, e.g., the set value L1 in FIG. 10. In a transient period (first period) where the set value L1 of the drive current is switched to the set value L2, the drive current is attenuated at a relatively large attenuating rate (first attenuating rate). In the second period ranging from the first period to the next step having the set value L3, a attenuating rate of the drive current is a second attenuating rate, smaller than the first attenuating rate.

The control to configure the waveform of the drive current as described above is as follows. The edge detector 17 detects the trailing edge of the digital signal D0 in a portion I in FIG. 8, and applies the output signal of the detector to the control logic circuit 11 (21) through the one-shot multi-vibrator 18 (28). The control logic circuit 11 (21) receives the output signal of the one-shot multi-vibrator 18 (28) to detect a time of the shift from one step to the next step from the received signal, and controls the drive circuit 12 (22) on the basis of the period of the received signal so that a attenuating rate in the attenuating region becomes larger than that in another attenuating region.

Thus, the drive device of the embodiment under discussion detects a region where a set value of current shifts to another set value of the next step in the decreasing direction of the current set value, and sets a attenuating rate of the current amplitude in the detected region to be larger than the attenuating rate in the step having the same set value. Therefore, the waveform of the drive current actually flowing into the drive coil 16(26) may be made to approach to an ideal sinusoidal waveform, to thereby suppress a waveform distortion of the drive current. Further, the attenuating rate in the attenuating region of each step is small, to there reduce the quantity of heat generated by the drive coil and the like.

Furthermore, the length of the first period where the drive current is attenuated at the first attenuating rate may be adjusted in accordance with the motor characteristic by properly adjusting the attenuating rate of the drive current in the transient region where a step is shifted to the next step. By so doing, the stepping motor can be driven efficiently.

As described above, the drive device of the above-mentioned embodiment is based on a technical idea that a region where a set value of current shifts to another set value of the next step is detected, and the attenuating rate of the current amplitude in the detected region is set to be larger than the attenuating rate in the step having the same set value. It is evident that the implementation of the technical idea is not limited to the above-mentioned one. For example, the number of set values may be selected as design demands.

In the embodiment described above, a time point where the attenuating rate of the drive current is changed to another, e.g., a large attenuating rate is changed to a small attenuating rate, is set at a time point after the lapse of a preset time, which is set in the one-shot multi-vibrator 18 (28) and determined by a time constant of the capacitor/resistor parallel circuit connected to the sam multi-vibrator. An alteration of the setting of the attenuating rate change is allowed in which a current detecting means detects the switching of a set value of the drive current in one step to another set value in the next step, and a time point where the current detecting means outputs its output signal is used as the time point of the attenuating rate change.

When a set value of current in one step is changed to another set value of the next step, the motor drive device of the embodiment sets the attenuating rate to be larger than a normal attenuating rate (i.e., the drive current is sharply attenuated) for a preset period of time from the attenuating rate changing time. Therefore, the drive current may be varied in a quick response to the change of the set value of current. It is noted that the attenuating rate switching is performed in the attenuating region where the absolute value of the set value decreases. Therefore, the attenuation of the drive current performed when the set value is switched to another is quick, thereby effectively suppressing the distortion of the drive current.

The switching of the attenuating rate in the attenuating region of the drive current may readily be realized by the use of a function to detect the attenuating region in the control logic circuit 11. In this case, the drive current may be attenuated at a relatively small attenuating rate in a region out of the attenuating region.

Thus, the motor drive device of the second embodiment can drive the stepping motor while being free from the problems of motor vibration and increase of the generated heat quantity.

While the present invention has been described by use of specific embodiments, it should be understood that the embodiments of the invention are illustrative and not restrictive, and hence that the invention may variously be modified, altered and changed within the spirits and scope of the appended claims.

What is claimed is:

1. A method for driving a stepping motor by controlling the drive current to be fed to a drive coil in such a manner that a waveform of the drive current is configured so as to approximate to a sinusoid over one period of the waveform comprising the steps of:

periodically increasing and attenuating with time the amplitude of the drive current such that upper peaks of the drive current are limited to be within set values of a current being varied stepwise and in a substantially sinusoidal fashion; and supplying said drive current to said drive coil of the stepping motor, wherein each set value is larger than that obtained from a sinusoidal waveform.

2. The driving method according to claim 1, wherein in said increasing and attenuating step, the drive current is attenuated at a first attenuation rate n and at a second attenuation rate m smaller than said first attenuation rate (n: a positive integer, m: a positive integer except n).

3. A method for driving a stepping motor comprising the steps of:

periodically increasing and attenuating with time the amplitude of a drive current such that upper peaks of the drive current are limited to be within set values of a current being varied stepwise and in a substantially sinusoidal fashion;

attenuating the drive current at a first attenuation rate for a first period of time subsequent to a change in value of said current being varied stepwise; and attenuating the drive current at a second attenuation rate, which is smaller than said first attenuating rate, for a second period of time ranging from the end of said first period until a change in value of said current being varied stepwise.

4. The driving method according to claim 3, wherein said first period is a predetermined time duration.

5. The drive method according to claim 3, wherein said first period ranges from a time point at which said current changes value until the amplitude value of the drive current reaches a set value of a next step.

6. The driving method according to claim 3, wherein when a decrease in the absolute value of the current is detected, the drive current is attenuated at said first attenuation rate for said first period, and at said second attenuation rate for said second period.

7. The driving method according to claim 6, wherein when a decrease in the absolute value of the current is not detected, the drive current is attenuated at said second attenuation rate for said first and second periods.

8. The driving method according to claim 3, wherein said set values are varied so that an amplitude variation of the drive current is configured to be substantially sinusoidal.

9. A drive device for driving a stepping motor by supplying to the drive coil of the stepping motor a drive current whose amplitude is periodically increased and attenuated with time such that upper peaks of the drive current are limited to be within set values of a current being varied stepwise and in a substantially sinusoidal fashion, said drive device comprising:

control logic circuit, which determines a phase of the drive current; and set value determination circuit which determines the set values and selects the set values in an amplitude-presence region in the vicinity of the zero-cross point of the drive current to be larger than the set values obtained from a sinusoidal waveform in said amplitude-presence region.

10. The drive device according to claim 9, wherein said set value determination circuit dynamically changes the set values of the waveform of the drive current.

11. A drive device for driving a stepping motor by supplying to the drive coil of the stepping motor a drive current whose amplitude is periodically increased and attenuated with time such that upper peaks of the drive current are limited to be within set values of a current being varied stepwise and in a substantially sinusoidal fashion, said drive device comprising:

current supplying means for supplying the drive current to the stepping motor;

first set-up means for setting a first attenuating rate of the drive current;

second set-up means for setting a second attenuating rate of the drive current;

current detecting means for detecting the drive current; and control means for controlling said current supplying means such that the drive current is attenuated at a first attenuation rate for a first period of time subsequent to a change in value of said current being varied stepwise, and the drive current is attenuated at a second attenuation rate, which is smaller than said first attenuation rate, for a second period of time ranging from the end of said first period until a subsequent change in value of said current being varied stepwise.

12. The drive device according to claim 11, a further comprising:

time setting means for setting said first period.

13. The drive device according to claim 11, further including an edge detector which detects a change in value of said current, wherein when said edge detector detects a change in value in said current, said control means terminates said first period.

14. The drive device according to claim 11, further comprising:

region detecting means for detecting a decreasing region wherein the absolute value of the current being varied stepwise decreases, wherein when the current is contained in said decreasing region, said control means causes the drive current to be attenuated at said first attenuating rate for said first period, and to be attenuated at said second attenuating rate for said second period.

15. The drive device according to claim 14, wherein when the current is not contained in said decreasing region, said control means causes the drive current to be attenuated at said second attenuating rate for said first and second periods.

16. The drive device according to claim 11, wherein said set values are varied so that an amplitude variation of the drive current is configured to be substantially sinusoidal.

17. A drive device for driving a stepping motor by supplying to the drive coil of the stepping motor a drive current whose amplitude is periodically increased and attenuated with time such that upper peaks of the drive current are limited to be within set values of a current being varied stepwise and in a substantially sinusoidal fashion, said drive device comprising:

current supply which supplies the drive current to the stepping motor;

first set-up circuit which sets a first attenuating rate of the drive current;

second set-up circuit which sets a second attenuating rate of the drive current;

current detector which detects the drive current; and control circuit which controls said current supply such that the drive current is attenuated at a first attenuation rate for a first period of time subsequent to a change in value of said current being varied stepwise, and the drive current is attenuated at a second attenuation rate, which is smaller than said first attenuation rate, for a second period of time ranging from the end of said first period until a subsequent change in value of said current being varied stepwise.

* * * * *